Aug. 11, 1964 NOBUTOSHI KIHARA ETAL 3,144,521

MAGNETIC TAPE RECORDER

Filed Nov. 1, 1960

Inventors
Nobutoshi Kihara
Kenji Suetsugu by Hill, Sherman, Meroni, Gross & Simpson Attys.

United States Patent Office 3,144,521
Patented Aug. 11, 1964

3,144,521
MAGNETIC TAPE RECORDER

Nobutoshi Kihara and Kenji Suetsugu, Tokyo, Japan, assignors to Sony Corporation, a corporation of Japan Filed Nov. 1, 1960, Ser. No. 66,529
Claims priority, application Japan Nov. 6, 1959
5 Claims. (Cl. 179—100.2)

This invention relates to magnetic tape recorders and, more particularly, to a magnetic tape recorder of video signals.

One object of this invention is to provide a magnetic recorder which is simple in construction, and accurate and reliable in operation.

Another object of this invention is to provide a magnetic tape recorder which is especially adapted for recording video signals.

Further objects, features and advantages of this invention will be more apparent from the following detailed description taken in conjunction with the accompanying figures of the drawing in which.

Figure 1:
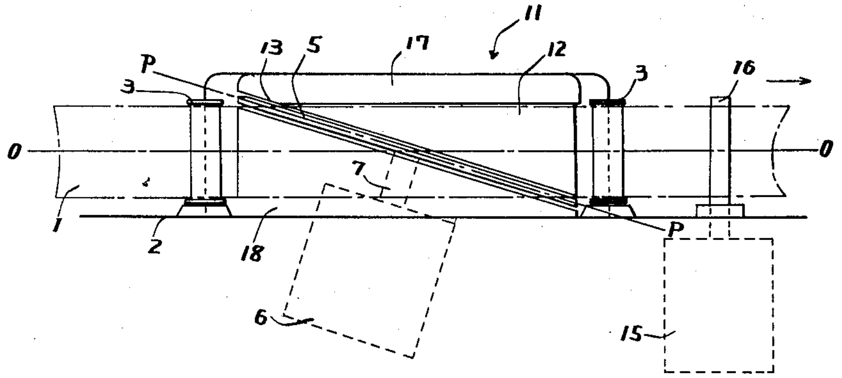
FIGURE 1 is a front view of a recorder constructed in accordance with one embodiment of this invention.
Figure 2:
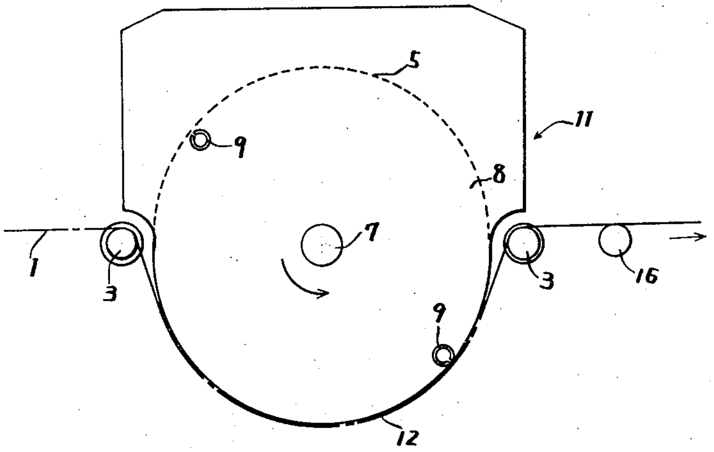
FIGURE 2 is a plan view of the recorder shown in FIGURE 1.

With reference to the drawing, a rotary member 5 is mounted at an inclined angle relative to the direction of motion of a magnetic tape 1. The magnetic tape 1 is drawn from left to right as seen in FIGURE 1 around two tape guide rollers 3 and an arcuate tape guide drum 11 which are mounted on a base plate 2. By this construction the magnetic tape 1 travels without being subjected to torsion or stress.

The rotary member 5 is so mounted as to revolve in the plane P—P, FIGURE 1, which is inclined relative to the line O—O, the direction of movement of the tape 1 and the tape contacts the member 5 along a desired portion of the drum 11. The rotary member 5 includes a disc 8 which is mounted on a shaft 7 of a driving motor 6, and a number of magnetic heads 9, each having a narrow air gap, are fastened to the periphery of the disc. Instead of a disc, a plurality of arms can be mounted on the shaft 7 and the magnetic heads fastened to the free ends of the arms.

The tape guide drum 11 forms the same arcuate surface as the periphery of the member 5. The tape guide drum 11 is divided into an upper piece 17 and a lower piece 18 which are separated to form a guide slot or groove 13 along the plane of rotation of the disc 8. A contact surface 12 which has substantially the same width as the tape 1 is formed on the arcuate portion of two pieces 17 and 18. It should be understood that an integrally formed guide drum having a guide groove can also be used.

The magnetic heads 9 mounted on the disc 8 or on the free ends of a group of arms extend through the groove 13 and are guided by the groove so that they move in the plane P—P and wipe across the tape 1.

The arc through which the magnetic heads 9 contact the tape 1 depends on the number of magnetic heads 9 used. For example, if two magnetic heads disposed at an angle of 180° to each other are used, the magnetic heads 9 should contact the magnetic tape 1 during substantially one-half the length of their travel. The guide rollers 3 can be positioned to provide the desired arc of contact. It is preferred that the recording and reproducing operation take place with at least two magnetic heads. In general, a plurality of these magnetic heads are mounted on the disc or arms at equal angular intervals and contact the magnetic tape through the guide groove 13 in the tape guide drum 11.

The magnetic tape 1 is drawn past the guide rollers 3, along the tape contacting surface 12 of the drum 11, and past the rotary member 5 by a capstan shaft 16. The capstan shaft 16 is part of a capstan driving motor 15 and cooperates with a pinch roller (not shown) in the well known manner.

Figure 3:
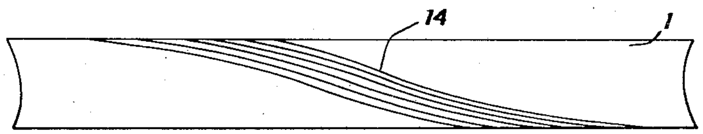
FIGURE 3 is a diagram that illustrates the operation of the recorder shown in FIGURES 1 and 2.

In a magnetic tape recorder constructed in accordance with this invention, signals are recorded on the magnetic tape 1 when the driving motor 6 for the member 5 and the capstan driving motor 15 are simultaneously driven. At this time a magnetic record scanning line or track 14 is formed across the tape 1 as shown in FIGURE 3 which follows a sinusoidal path. This is because the movement of the magnetic heads 9 is a so-called simple harmonic motion. That is, the heads 9 rotate from the left highest point with respect to the line O—O to the right lowest position and then return to the highest position. As seen in FIGURE 1, the head velocity is at a minimum at the uppermost and lowermost positions and a maximum at the center.

The tangential velocity of the magnetic heads 9 is much higher than that of the magnetic tape 1. When the magnetic tape 1 travels in the same direction as the heads 9, a signal is recorded on the tape 1 along part of a sinusoidal path 14, FIGURE 3. As the speed of the tape is increased the recording takes place over a shorter length or portion of the sinusoidal path 14.

If two magnetic heads 9 are provided, each head contacts the tape during approximately one-half of its circumferential travel. If the number of the magnetic heads is $n$, the tape contacts each head during substantially $1/n$ of its travel.

The line scanned by each magnetic head on the magnetic tape 1 is comparatively linear with the exception of the neighborhoods near the uppermost and the lowermost points in the travel of the heads. The scanning line on the tape 1 becomes more linear as the number of magnetic heads is increased.

In the arrangement above described, as the magnetic tape travels the magnetic heads are energized by video signals. Any suitable mechanism such as slip rings can be used to connect the signals to the revolving magnetic heads from a stationary part.

When using an apparatus constructed in accordance with this invention, the magnetic recording operation can be performed on a magnetic tape which runs in a standard direction, for example, the horizontal direction, without subjecting the tape to torsion or stress on any part thereof. Therefore, the video signals can be recorded and later reproduced accurately without a discrepancy in the scanning positions between the recording and reproducing mechanisms, which might otherwise occur due to a partial extension, shrinkage or the like of the tape.

It will be understood that many modifications and variations may be effected without departing from the scope of the novel concepts of this invention.

We claim as our invention:

1. A magnetic tape recorder comprising
a tape guide member having an arcuate guide surface,
means for drawing a magnetic tape across said tape guide member in contacting relationship with said guide surface over an arcuate extent of said guide surface which is substantially less than 360 degrees,
said tape guide member having a substantially linear slot formed therein which extends diagonally across said guide surface, and
a rotatable member having a plurality of magnetic head elements mounted thereon and extending through said slot for contact with a magnetic tape which is drawn across said guide surface, said arcuate guide surface having a dimension in the direction at right angles to the direction of tape movement thereacross many times the width of said slot for receiving a relatively wide magnetic tape the width of which is many times wider than the width of said slot.

2. A magnetic tape recorder comprising means defining a tape transport path for receiving a magnetic tape therealong and including an arcuate tape guide drum having a tape contact surface formed thereon, said tape guide drum having a substantially linear slot formed therein which extends across said contact surface and which lies in a plane forming an oblique angle with respect to the axis of said tape guide drum, tape guide rollers disposed at opposite sides of said tape guide drum along said tape transport path and having axes substantially parallel to the axis of said tape guide drum, means for moving a magnetic tape along said tape transport path around a first of said guide rollers over said tape contact surface and around the other of said guide rollers, a rotatable member having a plurality of magnetic scanning means mounted thereon at substantially equal angular distances around a circle with the scanning means extending through said slot for contacting a magnetic tape being drawn along said tape transport path, and means for rotating said rotatable member to move said magnetic scanning means successively along said slot for scanning of a magnetic tape at said tape contact surface of said drum.

3. A magnetic tape recorder comprising a tape guide drum having an arcuate tape contact surface with a substantially linear slot therein which is inclined at an oblique angle relative to the axis of said drum, means for moving a magnetic tape across said contact surface in a direction substantially at right angles to the axis of said drum, guide rollers for the magnetic tape which are disposed at the opposite sides of the tape guide drum with respect to the direction of movement of the tape for guiding the magnetic tape into contacting relation to the contact surface of the tape guide drum, magnetic scanning means for movement along said slot in scanning relation to a magnetic tape engaging said contact surface of said tape guide drum, and means for moving said magnetic scanning means along said slot in a direction having a component with the same direction as the direction of movement of the magnetic tape.

4. A magnetic tape recorder comprising means providing a tape contact surface having an arcuate configuration in a first plane and having a straight line configuration with respect to planes intersecting said surface and disposed at right angles to said first plane, tape guide means positioned adjacent said contact surface for guiding a magnetic tape across said surface in conforming relation thereto, means for moving a magnetic tape past said tape guide means and across said tape contact surface in conforming relation to a substantial portion of the arcuate extent thereof, said tape contact surface having a slot formed therein extending at an oblique angle with respect to the first plane and at a corresponding angle to the direction of movement of the magnetic tape, magnetic scanning means for movement along said slot in scanning relation to a magnetic tape conforming to said tape contact surface, and means for moving said magnetic scanning means cyclically along said slot for tracing successive lines extending generally diagonally across the magnetic tape.

5. A transducer mechanism comprising transducer head means having transducer scanning means movable along an orbital scanning path and having a transverse dimension at said transducer scanning means transverse to the direction of movement thereof substantially determining the width of a scanning path to be traced thereby, a record medium movable in a predetermined direction corresponding to the direction of a longitudinal center line of the record medium and having a transverse dimension transverse to the direction of movement of the record medium many times greater than said transverse dimension of the transducer head means, and means for moving said record medium in said predetermined direction along a record medium path substantially conforming to the orbital path of the transducer scanning means for a portion of the orbital path of the scanning means substantially less than the complete orbital path of the scanning means with the direction of movement of the record medium being diagonal to said portion of the orbital path of the transducer scanning means for scanning of the record medium along scanning paths which scanning paths extend obliquely with respect to the direction of movement of the record medium and which scanning paths have widths which are a small fraction of the lengths of said scanning paths, said record medium having its center line lying in a single plane throughout the extent of the record medium both at the record medium path substantially conforming to the orbital scanning path of the transducer scanning means and immediately in advance of and beyond said record medium path with respect to the direction of movement of the record medium.

References Cited in the file of this patent

UNITED STATES PATENTS

| | | |
|---|---|---|
| 2,352,023 | Schuller | June 20, 1944 |
| 2,773,120 | Masterson | Dec. 4, 1956 |
| 2,909,616 | Marty | Oct. 20, 1959 |

FOREIGN PATENTS

| | | |
|---|---|---|
| 833,278 | Great Britain | Apr. 21, 1960 |